United States Patent
Huggett et al.

(10) Patent No.: US 9,614,979 B2
(45) Date of Patent: Apr. 4, 2017

(54) SYSTEM AND METHOD FOR GENERATING CHARGING DATA FOR SHORT MESSAGE DELIVERY

(71) Applicant: Mavenir Systems, Inc., Richardson, TX (US)

(72) Inventors: Robert B. Huggett, Reading (GB); Jyotirmay Bareria, Richardson, TX (US)

(73) Assignee: Mitel Mobility Inc., Richardson, TX (US)

(*) Notice: Subject to any disclaimer, the term of this patent is extended or adjusted under 35 U.S.C. 154(b) by 63 days.

(21) Appl. No.: 14/677,083

(22) Filed: Apr. 2, 2015

(65) Prior Publication Data

US 2016/0295025 A1 Oct. 6, 2016

(51) Int. Cl.
*H04M 11/00* (2006.01)
*H04M 15/00* (2006.01)
*H04W 4/24* (2009.01)
*H04W 4/14* (2009.01)

(52) U.S. Cl.
CPC ........... *H04M 15/66* (2013.01); *H04M 15/41* (2013.01); *H04W 4/14* (2013.01); *H04W 4/24* (2013.01); *H04M 11/00* (2013.01)

(58) Field of Classification Search
CPC ...... H04M 15/66; H04M 15/41; H04M 11/00; H04W 4/14; H04W 4/24
USPC ................................................ 455/406, 466
See application file for complete search history.

(56) References Cited

U.S. PATENT DOCUMENTS

| | | | | |
|---|---|---|---|---|
| 8,630,618 B2* | 1/2014 | Keren | ................. | H04L 12/1403 379/114.1 |
| 2005/0117602 A1* | 6/2005 | Carrigan | ............... | H04L 51/066 370/466 |
| 2007/0178919 A1* | 8/2007 | Huggett | .............. | H04W 88/184 455/466 |
| 2008/0207181 A1* | 8/2008 | Jiang | ....................... | H04W 4/14 455/414.1 |
| 2008/0261559 A1* | 10/2008 | Cai | ......................... | H04L 12/14 455/406 |
| 2008/0273679 A1* | 11/2008 | Russell | ............... | H04L 12/1403 379/114.28 |
| 2008/0293386 A1* | 11/2008 | Noldus | ................. | H04M 15/00 455/414.1 |

(Continued)

OTHER PUBLICATIONS

Universal Mobile Telecommunications System (UMTS); LTE; Support of Short Message Service (SMS) over Generic 3GPP Internet Protocol (IP) Access; Stage 2 (3GPP TS 23.204 Version 11.5.0 Release 11), Technical Specification; Sep. 2003; pp. 1-56, ETSI TS 123 204 v11.5.0; ETSI 650 Route des Lucioles F-06921, Sophia Antipolis Cedex, France.

(Continued)

*Primary Examiner* — Mong-Thuy Tran

(57) ABSTRACT

A method encoded in a memory of a specialized network node configured for allowing an SMSC to be informed of the location of the UE originating a short message via an IP-SM-GW and also of the location of the receiving UE when a short message is delivered through an IP-SM-GW. Additionally the disclosed method ensures that charging systems can correlate IP-SM-GW charging requests for a short message with any charging requests generated by the SMSC for the same message.

18 Claims, 6 Drawing Sheets

(56) References Cited

U.S. PATENT DOCUMENTS

| | | | |
|---|---|---|---|
| 2009/0013087 A1* | 1/2009 | Lorch | H04M 1/72552 709/232 |
| 2009/0129372 A1* | 5/2009 | Pandey | G06Q 30/0267 370/352 |
| 2009/0131087 A1* | 5/2009 | Johan | H04W 4/14 455/466 |
| 2009/0221310 A1* | 9/2009 | Chen | H04L 12/5835 455/466 |
| 2010/0130162 A1* | 5/2010 | Yang | H04M 15/00 455/406 |
| 2011/0078061 A1* | 3/2011 | Cai | H04L 12/14 705/30 |
| 2011/0085535 A1 | 4/2011 | Shaheen | |
| 2011/0149750 A1 | 6/2011 | Sharma et al. | |
| 2011/0165898 A1 | 7/2011 | Drevon et al. | |
| 2012/0202537 A1* | 8/2012 | Zhou | H04L 65/1043 455/466 |
| 2013/0065582 A1* | 3/2013 | Jiang | H04W 4/14 455/432.1 |
| 2013/0303206 A1* | 11/2013 | Starsinic | H04W 4/12 455/466 |
| 2014/0155112 A1 | 6/2014 | Molnar et al. | |
| 2014/0269779 A1* | 9/2014 | Shan | H04W 28/24 370/509 |
| 2015/0045074 A1* | 2/2015 | Wong | H04L 12/5895 455/466 |

OTHER PUBLICATIONS

Digital Cellular Telecommunications System (Phase 2+); Universal Mobile Telecommunications System (UMTS); Technical Realization of Short Message Service (SMS) (3GPP TS 23.040 version 9.2.0 Release 9), Technical Specification; Apr. 2010; pp. 1-203, ETSI TS 123 040 v9.2.0; ETSI 650 Route des Lucioles—F-06921 Sophia Antipolis Cedex, France.

3rd Generation Partnership Project; Technical Specification Group Service and System Aspects; Telecommunication Management; Charging Management; Short Message Service (SMS) Charging (Release 9); Technical Specification; Dec. 2012; pp. 1-32, 3GPP TS 32.274 v9.0.0; 3GGP Support Office Address: 650 Route des Lucioles—Sophia Antipolis, Valbonne, France.

3rd Generation Partnership Project; Technical Specification Group Core Network and Terminals; Mobile Application Part (MAP) Specification (Release 11), Technical Specification; Mar. 2012; pp. 1-956, 3GPP TS 29.002 v11.2.0; 3GPP Support Office Address 650 Route des Lucioles—Sophia Antipolis Valbonne—France.

3rd Generation Partnership Project; Technical Specification Group Service and System Aspects; Telecommunication Management; Charging Management; Short Message Service (SMS) Charging (Release 9); Dec. 2012; pp. 1-32, 3GPP TS 32.274 v9.0.0; 3GGP Support Office Address: 650 Route des Lucioles—Sophia Antipolis, Valbonne, France.

Digital Cellular Telecommunications System (Phase 2+); Universal Mobile Telecommunications System (UMTS); Technical Realization of Short Message Service (SMS) (3GPP TS 23.040 version 9.2.0 Release 9), Technical Specification; Apr. 2010; pp. 1-203, ETSI TS 123 040 v9.2.0; ETSI 650 Rute des Lucioles F-06921 Sophia Antipolis Cedex, France.

Universal Motile Telecommunications System (UMTS); LTE; Support of Short Message Service (SMS) over Generic 3GPP Internet Protocol (IP) Access; State 2 (3GPP TS 23.204 Version 11.5.5 Release 11), Technical Specification; Sep. 2003; pp. 1-56, ETSI TS 123 204 v11.5.0; ETSI 650 Route des Lucioles F-06921, Sophia Antipolis, France.

* cited by examiner

SYSTEM AND METHOD FOR GENERATING CHARGING DATA FOR SHORT MESSAGE DELIVERY

FIELD

The present disclosure relates to a mobile telecommunication network, and more particularly to a system and method for system and method for generating charging data for short message delivery.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE) or Mobile Station (MS), may operate in a wireless communication network that provides high-speed data and/or voice communications. The UE has access to mobile services via an Access Network (AN). The Access Network generally comprises a Radio Access Network (RAN) and a Core Network (CN).

There are different types of RANs, based on different types of Radio Access Technologies, such as for example: Global System for Mobile Communications (GSM)/General Packet Radio Service (GPRS) RAN (also called GERAN), Universal Mobile Telecommunication System (UMTS) RAN (also called UTRAN), Long-Term Evolution (LTE) RAN (also called E-UTRAN), Wireless Local Area Network (WLAN), WIMAX, . . . etc.

The wireless communication networks may implement circuit-switched (CS) and/or packet-switched (PS) communication protocols to provide various services. For example, the UE may operate in accordance with one or more of an Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA: includes Wideband-CDMA (W-CDMA) and Low Chip Rate (LCR) cdma2000 covers IS-2000, IS-95 and IS-856 standards. A TDMA network may implement a radio technology such as GSM. An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of UMTS. LTE is a new release of UMTS that uses E-UTRA. UTRA, E-UTRA, GSM, UMTS and LTE are described in specification documents from 3GPP. These various radio technologies and standards are known in the art.

The Internet Protocol Multimedia Subsystem (IMS) as defined by 3GPP is an all-IP architecture for offering multimedia services. The main function of IMS is to set up media communication sessions between users, and between users and applications. IMS uses Session Initiation Protocol (SIP), Radius protocol, and/or Diameter protocol for initiating, modifying, and terminating an interactive user session that involves multimedia elements, such as call sessions, voicemail, call forwarding, instant messaging and online games. The IMS core network includes the Call Session Control Function (CSCF) and the Home Subscriber Server (HSS). IMS can be used to deliver Short Message Service (SMS) messages, using the technique known as SMS over generic IP access. A network node, the IP Short Message Gateway (IP-SM-GW), acts as an interface between the IMS and the network elements that handle SMS messages. To transmit an SMS message, the UE embeds the message into a SIP signaling message and sends it to the IMS core network. The IMS core network hands the message to the IP-SM-GW, which extracts the embedded SMS message and sends it to the SMS interworking Mobile Switching Center (SMS-IWMSC). The SMS-IWMSC then forwards the message to the SMS Service Center (SC), which is responsible for delivery of the message to its destination. In the reverse direction the SMS Service Center (SC) uses another network function, the Gateway Mobile Switching Center for Short Message Service (SMS-GMSC), is used to deliver the SMS message. Collectively the SMS-IWMSC, the SMS-GMSC, and the SMS Service Center are called an SMSC.

DETAILED DESCRIPTION

The support of Short Message Service (SMS) over GSM/UMTS system is specified in 3GPP TS 23.040. In particular, the specification provides that the GSM/UMTS system is able to transfer a short message submitted from a Short Message Service Centre (SMSC) to a User Equipment (UE), and to provide information about delivery success of the short message in a delivery report or a failure report. The support of SMS over a generic IP-based Access Network using IMS capabilities is specified in particular in 3GPP TS 23.204. The corresponding architecture is specified in that specification and reproduced in FIG. 1.

Figure 1:
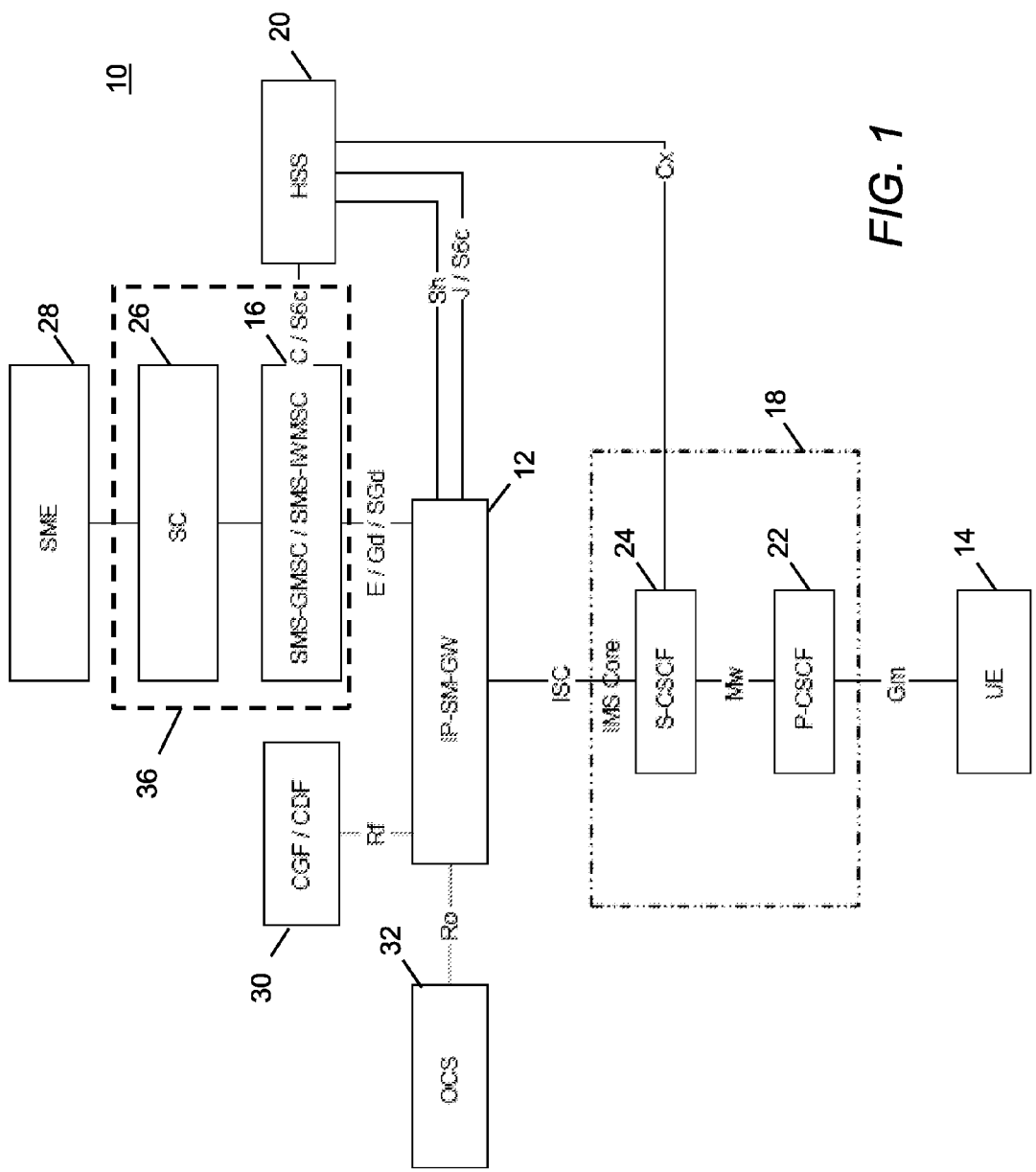
FIG. 1 is a simplified block diagram of an exemplary telecommunication network architecture according to the present disclosure.

FIG. 1 is a simplified network architectural diagram of a telecommunications network 10 for providing Short Message Service (SMS) over a generic IP-Connectivity Access Network (IP-CAN). SMS over IP as specified in 3GPP TS 23.204 is based on IMS signaling. It is transparent to the Access Network (e.g., E-UTRAN and EPC). In this architecture, an IP-Short-Message-Gateway (IP-SM-GW) 12 provides the interworking (either at the service level or at the transport level) for delivery of short messages between the IP-based UE 14 and the SMSC 36. The IP-SM-GW 12 has the function of determining the domain (CS/PS or IMS) for the delivery of a short message.

The C or S6c interface between the SMS-GMSC and HSS 20 allows the SMS-GMSC 16, using MAP or a Diameter based protocol, to obtain the address of the IP-SM-GW 12. The Sh or J/S6c interface between the IP-SM-GW 12 and HSS 20 is used for retrieving SMS related data from the HSS, including subscriber data of the short message service similar to the data for the current CS/PS domain and additional service data on the service authorization for the encapsulated short message delivery via IMS. The E/Gd/SGd interface allows the IP-SM-GW 12 to connect to the SMS-GMSC 16, appearing to the SMS-GMSC as a Mobile Switching Center (MSC), Serving General Packet Radio Service (GPRS) Support Node (SGSN), or Mobility Management Entity (MME).

The IMS network includes the Call Session Control Function (CSCF) 18 and the Home Subscriber Server (HSS) 20. The CSCF 18 facilitates session setup and teardown using SIP (Session Initiation Protocol). The HSS 20 plays the role of a location server in IMS and also serves as a repository for subscriber data. The CSCF 18 is divided into three logical entities: Proxy CSCF (P-CSCF) 22, Interrogating CSCF (I-CSCF) (not explicitly shown), and Serving CSCF (S-CSCF) 24. The P-CSCF 22 is the first point of contact for the IMS terminal and is responsible for routing incoming SIP messages to the IMS registrar server and for facilitating policy control. The S-CSCF 24 uses Diameter Cx and Dx interfaces to the HSS 20 to download user profiles and upload user-to-S-CSCF associations. It also handles SIP registrations. The ISC interface allows the IP-SM-GW 12 to receive third party registration requests and short messages from the IMS core and to forward received messages to the IP-based UE 14 via the IMS core 18.

Also coupled to the IP-SM-GW 12 is Charging Gateway Function (CGF) and Charging Data Function (CDF), shown as a co-located unit 30, via an Rf interface. A Charging Trigger Function (CTF) is tasked with collecting the information pertaining to chargeable events within the network element, assembling this information into matching charging events, and sending these charging events towards the CDF 30. The CDF 30 receives charging events from the CTF via the Rf reference point, and uses the information contained in the charging events to construct Call Data Records (CDRs) or charging records. The CDRs produced by CDF are then transferred to the CGF 30. In the current example, the IP-SM-GW 12 may be viewed as comprising the CTF for billing purposes. The SMSC 36 is also a valid CTF in this scenario.

Another network element coupled to the IP-SM-GW 12 is Online Charging System (OCS) 32 via an Ro interface. OCS 32 is used for real time charging for SMS services. The OCS 32 performs the appropriate credit processing based on the received request to debit units. It is also valid for the SMSC 36 to connect to the OCS 32 via an Ro interface for the same purposes.

The IMS can be used to transmit and deliver short messages, using the technique known as SMS over generic IP access. The network node, IP-SM-GW 12, acts as an interface between the IMS and the network elements that handle SMS messages. To transmit an SMS message, the UE 14 embeds the message into a SIP signaling message and sends it to the IMS 18. The S-CSCF 24 analyzes the SIP message request against the initial filter criteria (iFC) and determines whether to send the SIP message request to the IP-SM-GW 12. The iFC are made available from the HSS 20 to the S-CSCF 24 during user registration and indicate the user's subscription information. This subscription information includes information about the application server to be contacted and trigger points that should be checked before the application server is contacted. The IP-SM-GW 12 extracts the embedded SMS message and sends it to a standard SMS device, the SMSC 36. The SMSC 36 is responsible for the delivery of the message to its destination, such as a Short Message Entity (SME) 28, i.e., an SMS terminal which may be another mobile device. The SMSC 36 may store the message. The SMSC 36 returns a submission report, which is then forwarded to the UE 14 in a SIP message. If the intended recipient has a legacy device then the SMSC 36 delivers the message via an MSC or SGSN as described in 3GPP 23.040. If the recipient has an IMS-enabled handset then the SMSC 36 delivers the SMS message via the IP-SM-GW 12 then the IMS core 18 to the UE 14.

When a short message is not delivered to the destination mobile device via IMS signaling, the IP-SM-GW 12 is aware of the message non-delivery, and stores this information locally and notifies the HSS 20. In this situation, the IP-SM-GW 12 may, if configured to do so, attempt to deliver the short message to the recipient UE via CS or PS. This process is optional and is commonly called fallback. When the IP-SM-GW falls back to delivering the short message via CS or PS, the address of the MSC/SGSN to which the mobile device (UE) is attached is not made available to the SMSC 36. All MT SMS messages terminated through the IP-SM-GW 12 appear to the SMSC 36 to have terminated on an MSC/SGSN with the address of the IP-SM-GW. This creates a problem when billing for the short message service, as this information is needed to generate the proper charging records. The presence of the IP-SM-GW also conceals from the SMSC 36 the exact location of a UE originating a short message on the IMS network. All MO SM from the IMS network appears to the SMSC 36 to originate from an MSC/SGSN with the address of the IP-SM-GW 36.

Figure 2:
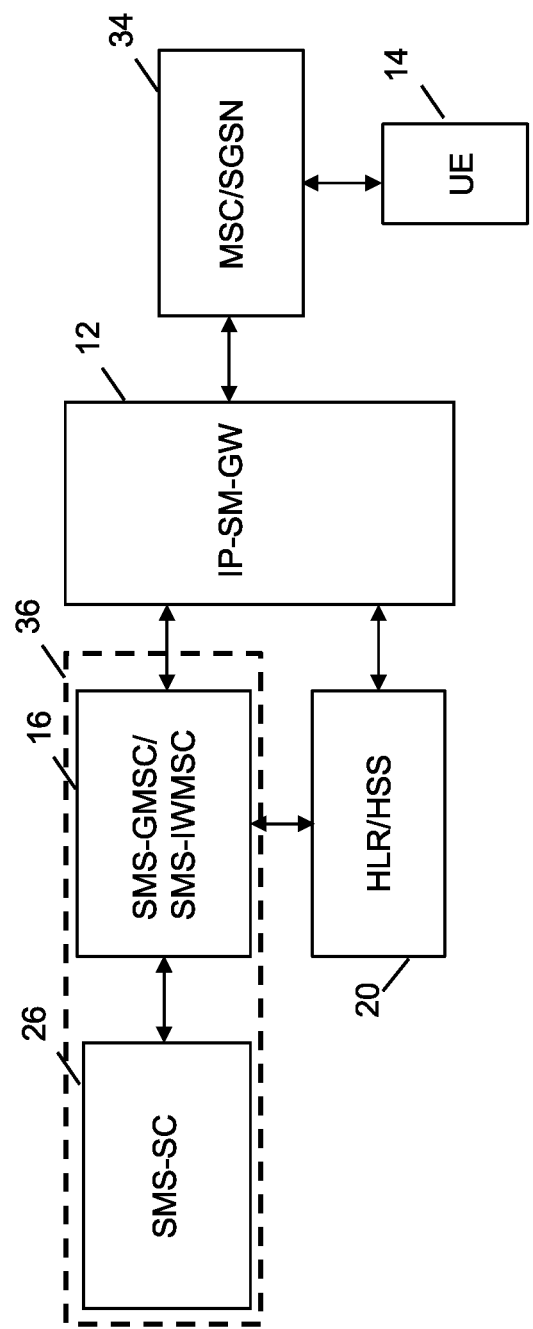
FIG. 2 is another simplified network diagram for illustrating the delivery of SMS over IMS fallback to Circuit Switched (CS) or Packet Switched (PS) network.

FIG. 2 is another simplified network diagram for illustrating the delivery of SMS over IMS fallback to Circuit Switched (CS) network. The SMSC 36 is a network node responsible for relaying a short message to a recipient UE 14. Optionally an SMSC may store a message. The SMS-GMSC 16 is a function of an SMSC capable of receiving a short message from the SMS-SC 26 function, interrogating the HLR/HSS 20 for routing information and SMS information, and delivering the short message to the next node en route to the recipient UE 14. The IP-SM-GW 12 performs the function of domain selection (CS/PS/IMS) in order to decide the routing of the short message. The IP-SM-GW 12 also responsible for protocol interworking between the IP-, PS- and CS-based network elements, including network elements MSC, SGSN (shown together as element 34).

Figure 3:
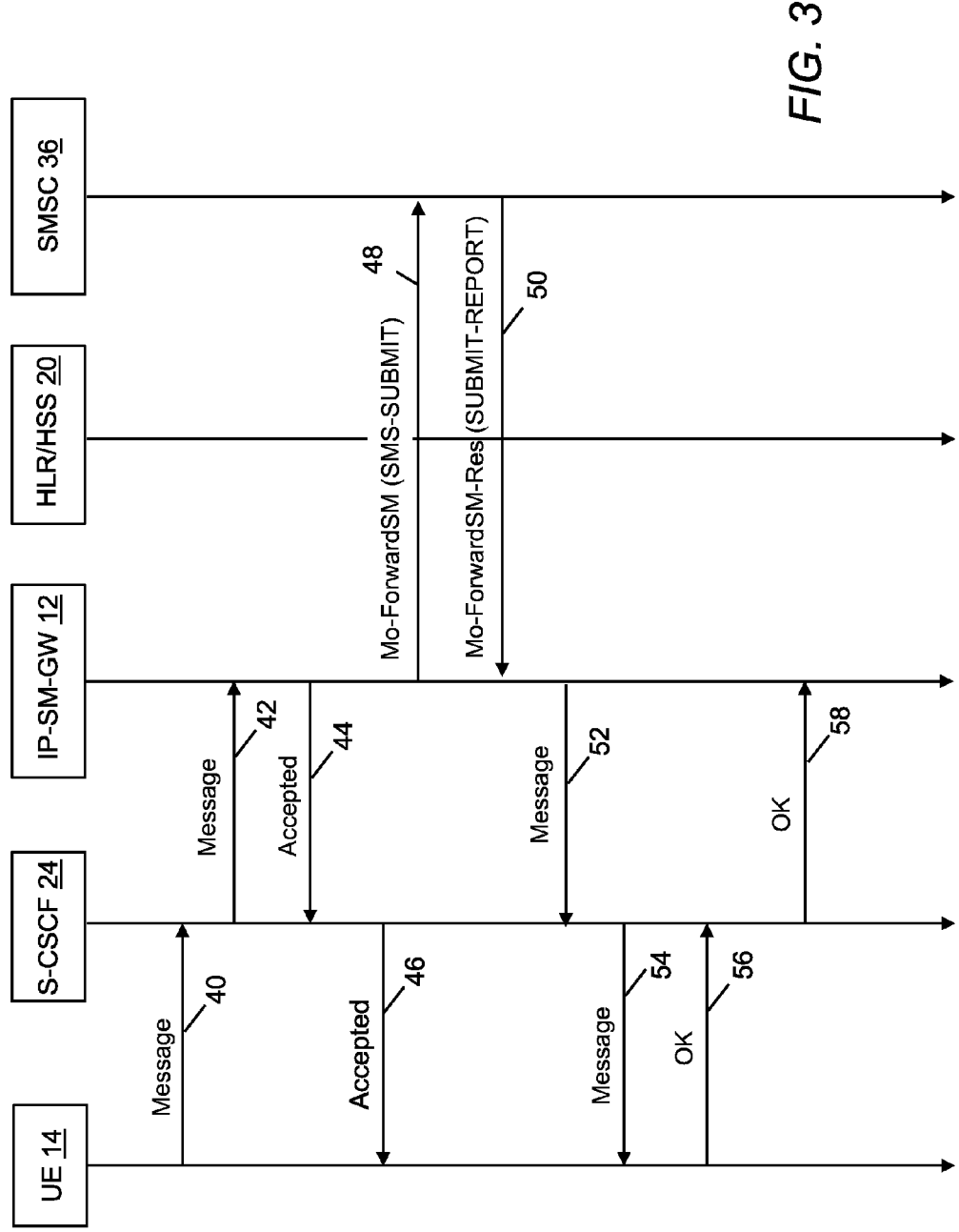
FIG. 3 is a simplified message flow diagram of a mobile-originating short message delivery process from IMS to SMSC according to the teachings of the present disclosure.

FIG. 3 is a simplified message flow diagram of a mobile-originating short message delivery process from IMS to SMSC according to the teachings of the present disclosure. The UE 14 initially registers to S-CSCF 24 according the IMS registration procedure. The UE 14 submits the encapsulated Short Message (SMS-SUBMIT, SC Address) to the S-CSCF 24 using an appropriate SIP method (reference numeral 40). The S-CSCF 24 forwards the encapsulated Short Message (SMS-SUBMIT, SC Address) to the IP-SM-GW (AS) 12 based on the stored iFC (reference numeral 42). The IP-SM-GW 12 acknowledges the SIP message (reference numeral 44). The SIP message acknowledgement is forwarded by the S-CSCF 24 to the UE 14 (reference numeral 46). The IP-SM-GW 12 performs service authorization based on the stored subscriber data, and checks whether the subscriber is authorized to use the short message service. In addition, the IP-SM-GW 12 also checks whether the user is authorized to use the encapsulated Short Message delivery via IMS. The IP-SM-GW 12 then extracts the Short Message (SMS-SUBMIT) and forwards it towards the SMSC 36 using standard MAP signaling (Mo-ForwardSM 48). The Mo-ForwardSM message 48 includes a unique identifier assigned to this particular SMS message that is used by the IP-SM-GW 12 and SMSC 36 to reference this short message. This unique reference identifier is used to generate charging records related to the delivery of this short message. The Charging Collection Function (CCF) also uses this reference identifier to correlate the IP-SM-GW 12 charging records with the SMSC 36 charging records to bring together all of the component costs of delivering the short message.

The SMSC 36 sends a Submit report (SUBMIT-REPORT) to the IP-SM-GW 12 (Mo-ForwardSM-Res 50). The IP-SM-GW 12 then sends the Submit Report to the S-CSCF 24, encapsulated in an appropriate SIP request (reference numeral 52). The S-CSCF 24 sends the Submit report to the UE (reference numeral 54). The UE 14 acknowledges the SIP request (reference numeral 56). The S-CSCF 24 forwards the acknowledgement of the SIP request to IP-SM-GW 12 (reference numeral 58).

Figure 4:
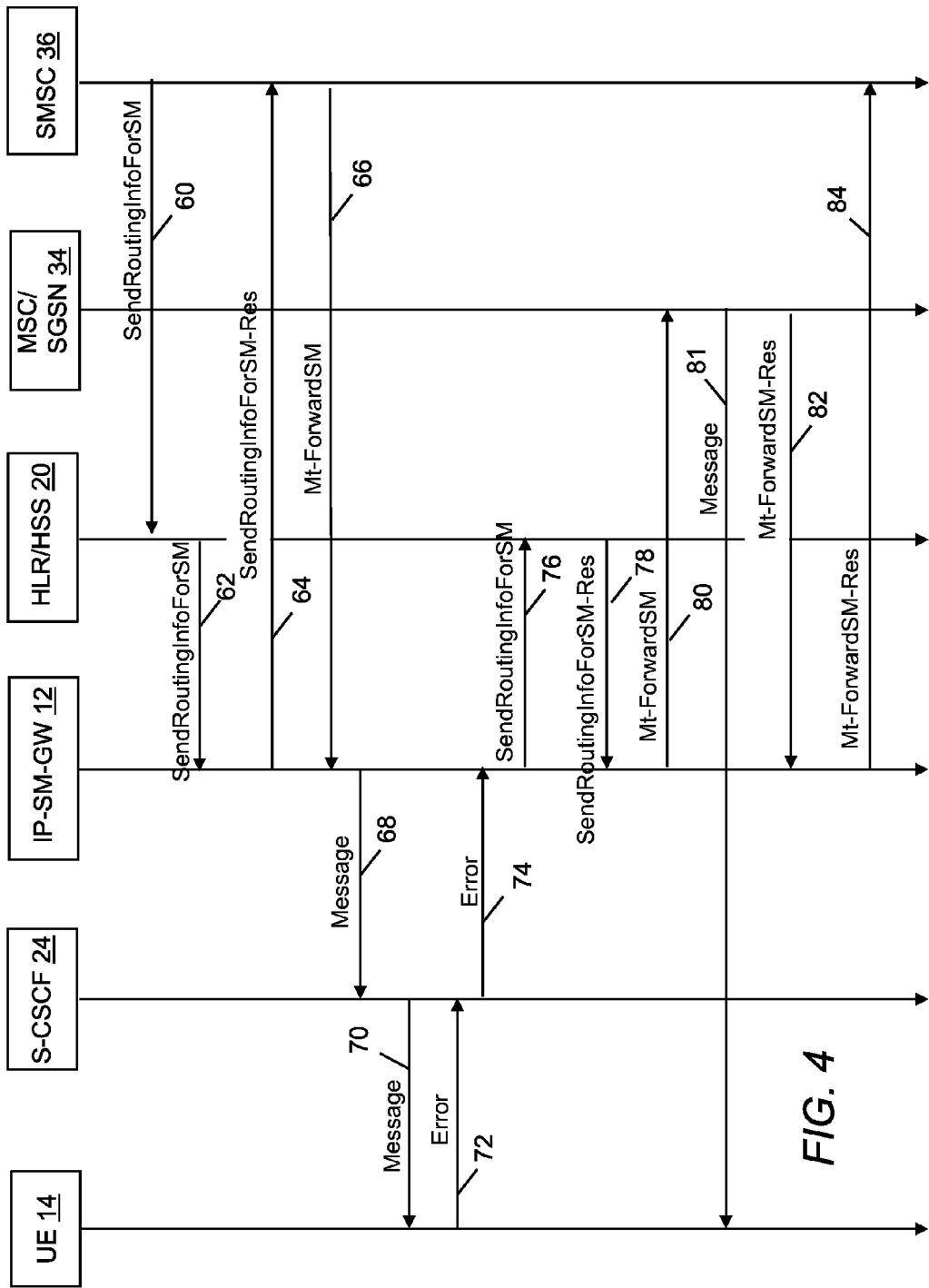
FIG. 4 is a simplified message flow diagram of a mobile-terminating short message delivery process from SMSC to IMS with fallback to CS or PS via IP-SM-GW according to the teachings of the present disclosure.

FIG. 4 is a simplified message flow diagram of a mobile-terminating short message delivery process from SMSC 36 to IMS with fallback to CS or PS via IP-SM-GW 12 according to the teachings of the present disclosure. The SMSC 36 interrogates the HLR/HSS 20 (using MSISDN) to retrieve routing information (SendRoutingInfoForSM 60). Based on the IP-SM-GW address stored in the HLR/HSS 20 for the user, the HLR/HSS 20 forwards the request to the corresponding IP-SM-GW 12 (SendRoutingInfoForSM 62). The IP-SM-GW 12 returns its own address in the form of Global Title or GT to the SMSC 36 for delivery of the short message (SendRoutingInfoForSM-Res 64). The IP-SM-GW 12 also returns a Correlation ID within the IMSI field of the SendRoutingInfoForSM-Res 64. The IP-SM-GW 12 creates this Correlation ID as per TS 23.040.

The SMSC 36 delivers the Short Message (SMS-DELIVER) to IP-SM-GW 12 including the Correlation ID received from the IP-SM-GW as an IMSI (Mt-ForwardSM 66). In a preferred embodiment, the SMSC 36 passes a unique identifier or reference number that is assigned to this particular short message as an argument in the Mt-ForwardSM message 66. The SMSC 36 and the IP-SM-GW 12 use this unique identifier in all charging records that are generated for this particular short message. The Charging Collection Function (CCF) uses this unique identifier to correlate the IP-SM-GW 12 charging records with the SMSC 36 charging records to bring together all of the components of the cost of delivering the short message.

The IP-SM-GW 12 performs service authorization based on the stored subscriber data. The IP-SM-GW 12 checks whether the subscriber is authorized to use the short message service. In addition, the IP-SM-GW 12 also checks whether the subscriber is authorized to use the encapsulated Short Message delivery via IMS. If the result of service authorization is negative, the IP-SM-GW 12 does not forward the message, and returns the appropriate error information to the SMSC 36 in a failure report. Domain selection function is not performed for MT-SMS without MSISDN and IMS is always used for delivery. Otherwise the IP-SM-GW 12 performs the domain selection function to determine the preferred domain for delivering the message according to operator policy and user preferences.

If the preferred domain is IMS, the IP-SM-GW 12 uses the Telephone Uniform Resource Identifier (TEL-URI) associated with the IMSI of the message received for the target UE to send the Short Message (SMS-DELIVER, SC Address) encapsulated in the appropriate SIP method towards the S-CSCF (SMS-DELIVER 68). If TEL-URI is not available, SIP-URI is used. S-CSCF 24 then forwards the encapsulated Short Message (SMS-DELIVER, SC Address) to the UE 14 (SMS-DELIVER 70). In the situation where the delivery of the short message to the UE over IMS fails, an error indication is returned to the S-CSCF 24 (ERROR 72), which in turn forwards it to the IP-SM-GW 12 (ERROR 74).

If fallback to CS/PS is allowed and enabled for the recipient, then the IP-SM-GW 12 inquires of the HLR/HSS 20 for routing information for the short message, using the MSISDN from the original SendRoutingInfoForSM 62 as the MSISDN in the SendRoutingInfoForSM 76 that it sends. It is also valid for the IP-SM-GW 12 to perform this query (SendRoutingInfoForSM 76) immediately after receiving the SendRoutingInfoForSM from the SMSC 36. The HLR/HSS 20 may respond with the IMSI and Global Title (GT) of both the MSC and the SGSN (SendRoutingInfoForSM-Res 78). If both MSC and SGSN addresses are returned, one is tried first and then the second. The IP-SM-GW 12 then forwards the short message to the serving MSC/SGSN 34 (Mt-ForwardSM 80), which successfully delivers the short message to the terminating UE 14, via the MSC/SGSN 34 (Message 81). The MSC/SGSN returns with a delivery report to the IP-SM-GW 12 (Mt-ForwardSM-Res 82). The IP-SM-GW 12, having learned of the successful delivery via CS, the IP-SM-GW 12 forwards the delivery report to the SMS-SC 36 (Mt-ForwardSM-Res 84). This delivery report will include the address of the handling MSC/SGSN 34 or a unique reference identifier for the short message, for the purpose of properly creating the charging records for the delivery of the short message. It should be noted that the response to the SMSC can be MAP Phase 1 ForwardShortMessage RESULT, MAP Phase 2 ForwardSM RESULT, or MAP Phase 3 Mt-ForwardSM-Res.

Accordingly, two options are described herein to properly generate charging records for the delivery of a short message over IMS when fallback to CS or PS occurs. The first is to assign a unique identifier to the short message that is shared between the SMSC 36 and the IP-SM-GW 12, so that all charging records generated for that particular short message are referenced and recognized by this unique identifier. The second option involves having the IP-SM-GW 12 passing the address of the MSC/SGSN 34 to which the terminating mobile device is attached to the SMS-SC upon successful delivery of the short message. Either or both of these options may be exercised to properly generate the charging records.

Figure 5:
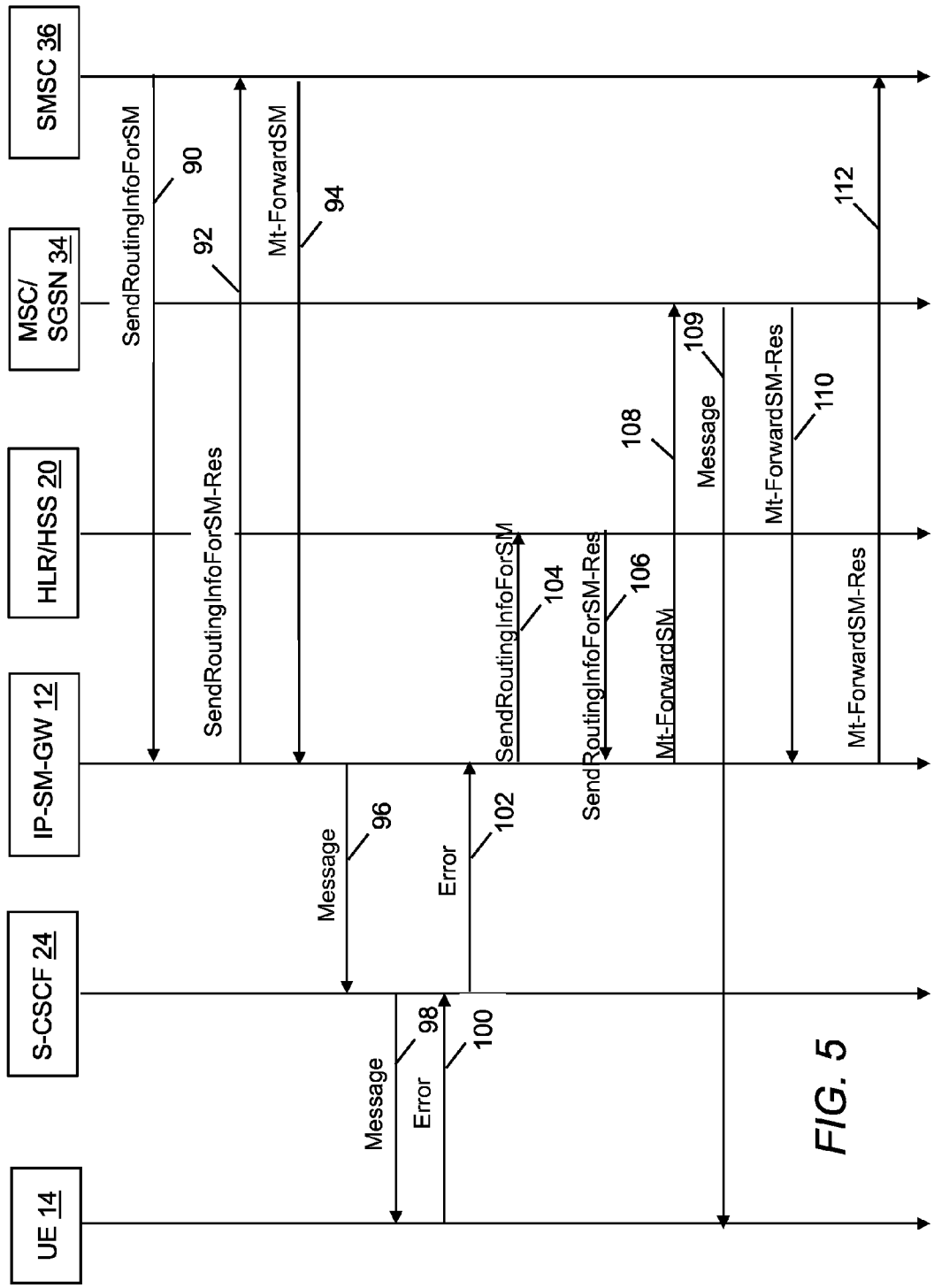
FIG. 5 is a simplified alternative message flow diagram of a mobile-terminating short message delivery process from SMSC to IMS with fallback to CS or PS via IP-SM-GW according to the teachings of the present disclosure.

FIG. 5 is a simplified message flow diagram of a mobile-terminating short message delivery process from SMSC 36 to IMS with fallback to CS or PS via IP-SM-GW 12 according to the teachings of the present disclosure. This scenario does not use MAP/J messages between the HLR and the IP-SM-GW 12 handled by the J interface. The SMSC 36 interrogates the IP-SM-GW 12 (using MSISDN) to retrieve routing information (SendRoutingInfoForSM 90). The IP-SM-GW 12 returns its own address in the form of Global Title or GT to the SMSC 36 for delivery of the Short Message (SendRoutingInfoForSM-Res 92) along with the MT Correlation ID.

The SMSC 36 delivers the Short Message (SMS-DELIVER) to IP-SM-GW 12 including the MT Correlation ID received from the IP-SM-GW 12 (Mt-ForwardSM 94). In a preferred embodiment, the SMSC 36 passes to the IP-SM-GW 12 a unique identifier or reference number that is assigned to this particular short message as an argument in the Mt-ForwardSM message 94. The SMSC 36 and the IP-SM-GW 12 use this unique identifier in all charging records that are generated for this particular short message. The CCF uses this unique identifier to correlate the IP-SM-GW 12 charging records with the SMSC 36 charging records to bring together all of the components of the cost of delivering the short message.

The IP-SM-GW 12 performs service authorization based on the stored subscriber data. The IP-SM-GW 12 checks whether the subscriber is authorized to use the short message service. In addition, the IP-SM-GW 12 also checks whether the subscriber is authorized to use the encapsulated Short Message delivery via IMS. If the result of service authorization is negative, the IP-SM-GW 12 does not forward the message, and returns the appropriate error information to the SMSC 36 in a failure report. Domain selection function is not performed for MT-SMS without MSISDN and IMS is used for delivery. Otherwise the IP-SM-GW 12 performs the domain selection function to determine the preferred domain for delivering the message according to operator policy and user preferences.

If the preferred domain is IMS, the IP-SM-GW 12 uses the Telephone Uniform Resource Identifier (TEL-URI) associated with the IMSI of the message received for the target UE to send the Short Message (SMS-DELIVER, SC Address) encapsulated in the appropriate SIP method towards the S-CSCF (SMS-DELIVER 96). If TEL-URI is not available, SIP-URI is used. S-CSCF 24 then forwards the encapsulated Short Message (SMS-DELIVER, SC Address) to the UE 14 (SMS-DELIVER 98). In the situation where the delivery of the short message to the UE 14 over IMS fails, an error indication is returned to the S-CSCF 24 (ERROR 100), which in turn forwards it to the IP-SM-GW 12 (ERROR 102).

If fallback to CS/PS is allowed and enabled for the recipient, then the IP-SM-GW 12 inquires of the HLR/HSS 20 for routing information for the short message, using the MSISDN from the original SendRoutingInfoForSM 90 as the MSISDN in the SendRoutingInfoForSM 104 that it sends. It is also valid for the IP-SM-GW 12 to perform this query (SendRoutingInfoForSM 104) immediately after receiving the SendRoutingInfoForSM 90 from the SMSC 36. The HLR/HSS 20 may respond with the IMSI and Global Title (GT) of both the MSC and the SGSN (SendRoutingInfoForSM-Res 106). If both MSC and SGSN addresses are returned, one is tried first and then the second. The IP-SM-GW 12 then forwards the short message to the serving MSC/SGSN (SMS-DELIVER 108), which successfully delivers the short message to the terminating UE 14, via the MSC/SGSN 34 (Message 109). The MSC/SGSN 34 returns with a delivery report to the IP-SM-GW 12 (SMS-DELIVER-REPORT 110). The IP-SM-GW 12, having learned of the successful delivery via CS, the IP-SM-GW 12 forwards the delivery report to the SMSC 36 (SMS-DELIVER-REPORT 112). This delivery report will include the address of the handling MSC/SGSN 34 or a unique reference identifier for the short message, for the purpose of properly creating the charging records for the delivery of the short message.

Again, two options are described herein to properly generate charging records for the delivery of a short message over IMS when fallback to CS or PS occurs. The first is to assign a unique identifier to the short message, so that all charging records generated for that particular short message are referenced and recognized by this unique identifier. The second option involves having the IP-SM-GW 12 passing the address of the MSC/SGSN 34 to which the terminating mobile device is attached to the SMSC 36 upon successful delivery of the short message. Either or both of these options may be exercised to properly generate the charging records.

For mobile originated short message delivery, the same solutions may be implemented. A unique reference identifier may be assigned to the short message, which is used to refer to the particular short message to generate charging records. Secondly, the IP-SM-GW 12 may pass the location of the UE 14 or the unique short message identifier to the SMSC 36 as a part of the arguments in the Mo-ForwardSM message.

Figure 6:
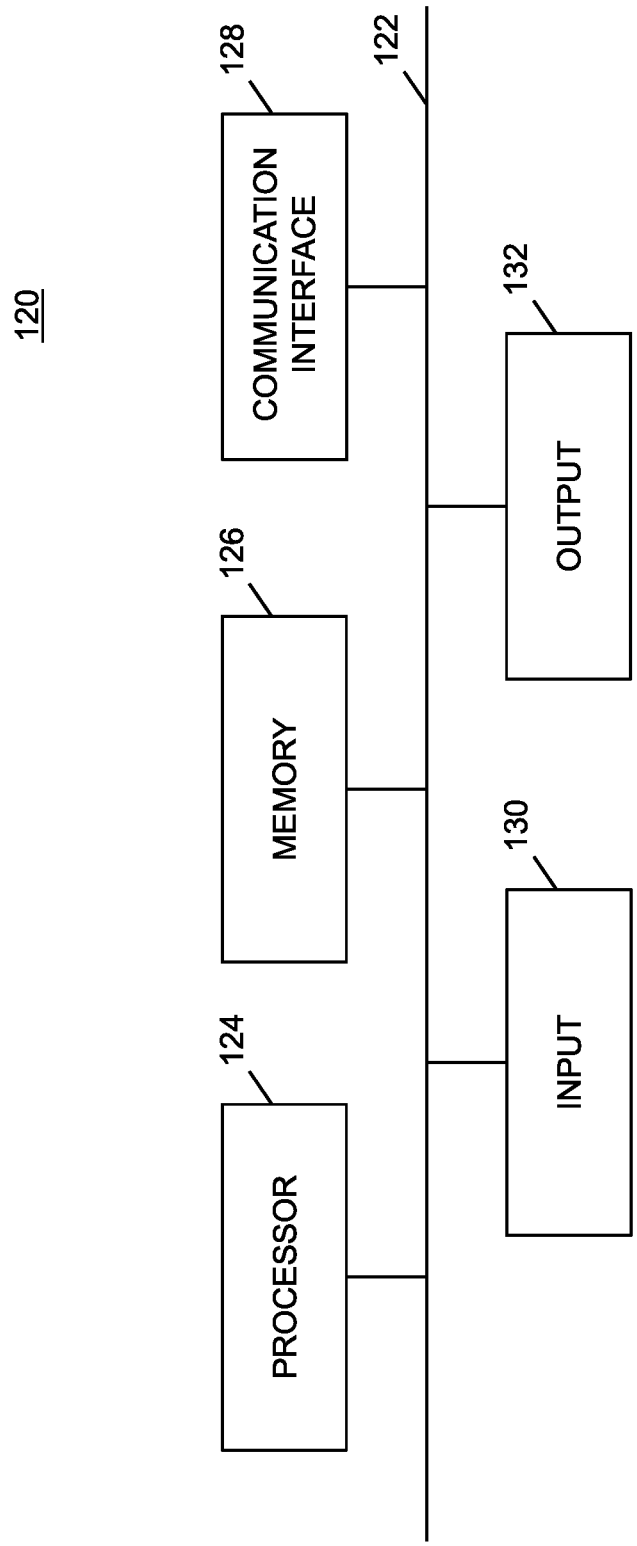
FIG. 6 is a simplified block diagram of an exemplary network node for the telecommunication network.

FIG. 6 is a simplified block diagram of an exemplary network node 120 for carrying out the instant method according to the present disclosure. The network node 120 may include a bus 122 interconnecting a processor 124, a memory 126, a communication interface 128, an input device 130, and an output device 132. The bus 122 enables communication among the components of network node 120. The processor 124 may include one or more processing units or microprocessors that interpret and execute coded instructions. In other implementations, the processor 124 may be implemented by or include one or more application-specific integrated circuits (ASICs), field programmable gate arrays (FPGAs), or the like.

The memory 126 may include a random access memory (RAM) or another type of dynamic storage device that stores information and instructions for execution by the processor 124. The memory 126 may also include a read-only memory (ROM) or another type of static storage device that stores static information and instructions for the processor 124. The memory 126 may further include other types of magnetic or optical recording medium and its corresponding drive for storing information and/or instructions. As used herein, the term "memory" is broadly to include registers, buffers, and other data constructs configured to hold data.

The communication interface 128 may include protocol stacks for processing data transmitted via a data protocol now know or to be developed. The communication interface 128 may include transceiver-like devices and antenna that enables the network node 120 to communicate via radio frequency with other devices and/or systems. The communication interface 128 may further include interfaces, ports, or connectors to other devices.

The input 130 may include one or more devices that permit an operator to enter information to the network node 120, such as a keyboard, a keypad, a mouse, a pen, a touch-sensitive pad or screen, a microphone, one or more biometric mechanisms, and the like. The output 132 may include one or more devices that outputs information to the operator, such as a display, a printer port, a speaker, etc.

As described herein, the network node 120 may perform certain specialized functions in response to the processor 124 executing specialized software instructions contained in a computer-readable medium, such as memory 126. The software instructions transform the processor 124 executing the instructions to carries out the processes described herein. A computer-readable medium may be defined as a physical or logical memory device. A logical memory device may include memory space within a single physical memory device or spread across multiple physical memory devices. The software instructions may be read into memory 126 from another computer-readable medium or from another device via a communication interface 128. The software instructions contained in the memory 126 may cause processor 124 to perform processes described herein. Alternatively, hardwired circuitry may be used in place of or in combination with software instructions to implement processes described herein. Thus, implementations described herein are not limited to any specific combination of hardware circuitry and software.

In this disclosure, the term "function" or "node" may be used to refer a physical circuit or collection of hardware components, a logical code module, functionality, and/or a combination of hardware and software entities. Although it is contemplated that the specialized methods described herein reside in the IP-SM-GW, however, it is contemplated that one or more other suitable network node(s) may carry out these methods.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

Glossary
3GPP Third Generation Partnership Project
AN Access Network
CCF Charging Collection Function
CDF Charging Data Function
CDMA Code Division Multiple Access
CDR Call Data Records
CGF Charging Gateway Function
CN Core Network
CS Circuit-Switched
CSCF Call Session Control Function
CTF Charging Trigger Function
EPC Evolved Packet Core
FDMA Frequency Division Multiple Access
GERAN GPRS Radio Access Network
GPRS General Packet Radio Service
GSM Global System for Mobile Communications
I-CSCF Interrogating Call Session Control Function
iFC initial filter criteria
IMS Internet Protocol Multimedia Subsystem
IMSI International Mobile Subscriber Identity
IP-CAN IP-Connectivity Access Network
IP-SM-GW IP Short Message Gateway
LTE Long-Term Evolution
MAP Mobile Application Part
MO Mobile Originating
MS Mobile Station
MT Mobile Terminating
MSISDN Mobile Station Integrated Services Digital Network
OCS Online Charging System
OFDMA Orthogonal Frequency Division Multiple Access
P-CSCF Proxy Call Session Control Function
PS Packet-Switched
RAN Radio Access Network
SC Service Center
SC-FDMA Single-Carrier Frequency Division Multiple Access
S-CSCF Serving Call Session Control Function
SGSN Serving General Packet Radio Service (GPRS) Support Node
SIP Session Initiation Protocol
SME Short Message Entity
SMS Short Message Service
SMS-GMSC Gateway Mobile Switching Center for Short Message Service
SMS-IWMSC Interworking Mobile Switching Center for Short Message Service
SMS-SC Short Message Service Center
TDMA Time Division Multiple Access
UE User Equipment
UMTS Universal Mobile Telecommunication System
UTRAN Universal Mobile Telecommunication System Radio Access Network
VoIP Voice over IP

What is claimed is:

1. A method encoded in a memory of a specialized network node configured for generating a charging record for delivering a Short Message Service (SMS) message over an Internet Protocol Multimedia Subsystem (IMS) network, comprising:
    determining routing information for the SMS message;
    receiving the SMS message with a unique charging identifier assigned to the SMS message by an SMS Service Center (SMSC) network node;
    attempting to deliver the SMS message to a destination device;
    receiving an error message generated in response to a failure to deliver the SMS message to the destination device via IMS;
    forwarding the SMS message to at least one of a Circuit-Switched (CS) and Packet-Switched (PS) network nodes to deliver the SMS message to the destination device;
    forwarding an address of the at least one of CS and PS network nodes that successfully delivered the SMS message to the destination device to the SMSC network node in response to a successful delivery; and
    using the address of the at least one of CS and PS network nodes, correlating Internet Protocol Short Message Gateway (IP-SM-GW) charging records and SMSC charging records to determine costs of delivering the SMS message.

2. The method of claim 1, wherein the method further comprises sending a delivery report that includes at least one of the unique charging identifier and the address of the at least one of CS and PS network nodes to the SMSC network node.

3. The method of claim 1, wherein receiving the SMS message with the assigned unique charging identifier comprises receiving an SMS-DELIVER message.

4. The method of claim 1, further comprising receiving an inquiry for routing information for an incoming SMS message, the inquiry including an MSISDN of the destination device.

5. The method of claim 1, further comprising generating a charging record for delivering the SMS message based on data associated with the assigned unique charging identifier.

6. The method of claim 1, wherein the method comprises forwarding an address comprises sending to the SMSC network node one of MAP Phase 1 ForwardShortMessage RESULT, MAP Phase 2 forwardSM RESULT, and MAP Phase 3 Mt-forwardSM-Res.

7. A method encoded in a memory of a specialized network node configured for providing data to generate a charging record for delivering a Short Message Service (SMS) message received over an Internet Protocol Multimedia Subsystem (IMS) network to a SMS Service Center (SMSC), comprising:
    assigning a unique charging identifier to the SMS message;
    determining a location of a UE that originated the SMS message;
    forwarding the unique charging identifier and the location of the UE to an SMSC network node; and using the unique charging identifier by an IP-SM-GE and an SMSC, correlating the charging records of the IP-SM-GW and the charging records of the SMSC to determine costs of delivering the SMS message.

8. The method of claim, 7, wherein forwarding the SMS message unique identifier and the UE location to SMSC comprises sending one of Mobile Application Part (MAP) Phase 1 ForwardShortMessage, MAP Phase 2 ForwardSM, and MAP Phase 3 Mo-ForwardSM that includes the unique charging identifier of the SMS message to the SMSC.

9. The method of claim 7, further comprising generating a charging record for delivering the SMS message based on data associated with the assigned unique charging identifier.

10. A specialized telecommunication network node configured to interface between an Internet Protocol Multimedia Subsystem (IMS) network and at least one of a Circuit-Switched (CS) and Packet-Switched (PS) network, the network node comprising:
at least one processor;
at least one communication interface; and
a memory having encoded thereon a method for generating a charging record for delivering a Short Message Service (SMS) message over an IMS network, comprising:
determining routing information for the SMS message;
receiving the SMS message with a unique charging identifier assigned by an SMS Service Center (SMSC) network node;
attempting to deliver the SMS message to the destination device;
receiving an error message generated in response to a failure to deliver the SMS message to the destination device via IMS;
forwarding the SMS message to at least one of a CS and PS network nodes to deliver the SMS message to the destination device;
forwarding an address of the at least one of CS and PS network node that successfully delivered the SMS message to the destination device to the SMSC network node in response to a successful delivery; and
using the address of the at least one of CS and PS network nodes, correlating Internet Protocol Short Message Gateway (IP-SM-GW) charging records and SMSC charging records to determine costs of delivering the SMS message.

11. The network node of claim 10, wherein the method further comprises forwarding the unique charging identifier to SMSC comprises sending a delivery report that includes at least one of the unique charging identifier and the address of the at least one of CS and PS network nodes.

12. The network node of claim 10, wherein the method further comprises receiving the SMS message with the assigned unique charging identifier comprises receiving an SMS-DELIVER message.

13. The network node of claim 10, wherein the method further comprises receiving an inquiry for routing information for an incoming SMS message, the inquiry including an MSISDN of the destination device.

14. The network node of claim 11, wherein the method further comprises generating a charging record for delivering the SMS message based on data associated with the assigned unique charging identifier.

15. The network node of claim. 11, wherein the method comprises forwarding an address comprises sending to the SMSC one of MAP Phase 1 ForwardShortMessage RESULT, MAP Phase 2 forwardSM RESULT, and MAP Phase 3 Mt-forwardSM-Res.

16. A specialized telecommunication network node configured to interface between an IMS network and at least one of a Circuit-Switched (CS) and Packet-Switched (PS) network, the network node comprising:
at least one processor;
at least one communication interface; and
a memory having encoded thereon a method for generating a charging record for delivering a Short Message Service (SMS) message over an Internet Protocol Multimedia Subsystem (IMS) network, comprising:
assigning a unique charging identifier to the SMS message;
determining a location of a UE that originated the SMS message;
forwarding the unique charging identifier and the location of the UE to an SMS Service Center (SMSC) network node in response to a successful delivery; and
using the unique charging identifier, correlating Internet Protocol Short Message Gateway (IP-SM-GW) charging records and SMSC charging records to determine costs of delivering the SMS message.

17. The network node of claim 16, wherein the method further comprises forwarding the SMS message unique identifier and UE location to SMSC comprises sending one of MAP Phase 1 ForwardShortMessage, MAP Phase 2 ForwardSM, and MAP Phase 3 Mo-ForwardSM that includes the unique charging identifier of the SMS message to the SMSC.

18. The network node of claim 16, wherein the method further comprises generating a charging record for delivering the SMS message based on data associated with the assigned unique charging identifier.

* * * * *